US006127024A

United States Patent [19]

Weiss et al.

[11] Patent Number: 6,127,024

[45] Date of Patent: Oct. 3, 2000

[54] SINGLE PLY BATTERY LABEL INCLUDING VARNISH WITH PATTERNED EDGES

[75] Inventors: Victor H. Weiss, Minnetonka; John G. Langbehn, deceased, late of Minnetonka, by Sandra J. Langbehn, legal representative; by Kirk J. Langbehn, executor, Minneapolis; David G. Dailey, Inver Grove Heights; Jeffrey Lee Anderson, Minnetonka, all of Minn.

[73] Assignee: Morgan Adhesives Company, Stow, Ohio

[21] Appl. No.: 09/082,600

[22] Filed: May 21, 1998

[51] Int. Cl.$^{7}$ .............................. B32B 3/02; B32B 5/14; B32B 7/12; H01M 2/02

[52] U.S. Cl. ......................... 428/204; 428/213; 428/354; 429/167; 429/176

[58] Field of Search ................................ 283/81; 428/40, 428/194, 198, 204, 343, 354, 461; 429/93, 159, 167, 176; 156/86

[56] References Cited

U.S. PATENT DOCUMENTS

| | | | |
|---|---|---|---|
| 3,032,463 | 5/1962 | Morgan | 156/253 |
| 3,873,018 | 3/1975 | Donnay | 215/256 |
| 4,013,494 | 3/1977 | Patterson | 156/86 |
| 4,220,695 | 9/1980 | Ishida et al. | 429/172 |
| 4,233,331 | 11/1980 | Lemke et al. | 426/407 |
| 4,392,898 | 7/1983 | Pithouse et al. | 156/85 |
| 4,608,284 | 8/1986 | Roales | 428/34.9 |
| 4,608,323 | 8/1986 | Zaborney | 429/167 |
| 4,801,514 | 1/1989 | Will et al. | 429/167 |
| 5,190,609 | 3/1993 | Lin et al. | 156/85 |
| 5,292,566 | 3/1994 | Shacklett, III | 428/40 |
| 5,328,738 | 7/1994 | McKillip et al. | 428/40 |
| 5,368,953 | 11/1994 | Zaborney et al. | 429/90 |
| 5,432,110 | 7/1995 | Gauthier et al. | 429/151 |
| 5,443,668 | 8/1995 | Zaborney et al. | 156/86 |
| 5,512,352 | 4/1996 | Haig | 438/195 |
| 5,747,192 | 5/1998 | Hughen et al. | 429/163 |
| 5,932,685 | 7/1999 | Mori et al. | 428/13 |
| 5,935,730 | 8/1999 | Will et al. | 372/167 |
| 5,952,122 | 9/1999 | Shacklett, III | 429/167 |
| 5,955,181 | 9/1999 | Peiffer et al. | 428/212 |

FOREIGN PATENT DOCUMENTS

| | | | |
|---|---|---|---|
| 59-123160 | 7/1984 | Japan | H01M 2/02 |
| WO 96/42115 | 12/1996 | WIPO . | |

*Primary Examiner*—Yogendra Gupta
*Assistant Examiner*—Christine Ingersoll
*Attorney, Agent, or Firm*—Lee, Mann, Smith, McWilliams, Sweeney & Ohlson; Timothy J. Engling, Esq.

[57] ABSTRACT

A single ply label for use as a battery label. The invention includes a polymeric film that has an ink layer or metallized outer surface that may include applied print graphics. A cured varnish is applied as the outermost layer adapted to form a continuous protective surface over the battery. The varnish on the label edges that shrink over the rims of the battery has a geometric pattern to accommodate the greater shrinkage of the film and still provide a substantially continuous surface of varnish protectant.

16 Claims, 7 Drawing Sheets

SINGLE PLY BATTERY LABEL INCLUDING VARNISH WITH PATTERNED EDGES

BACKGROUND OF THE INVENTION

The present invention relates to labels for dry cell batteries. More specifically, the invention is directed toward a single ply battery label with a varnish surface that has geometric patterns along two edges to adapt to shrinkage of the film and provide a substantially continuous surface of varnish protectant for the rims of a dry cell battery. Throughout this application the term "rim" or "rims" will be defined to mean the outer corner surface at each end of the battery.

A dry cell battery has first and second terminals that have opposite polarity on opposing ends of the battery. The battery is partially encased with a nonconductive label that wraps around the outer circumference of the battery and extends longitudinally beyond the rims of the battery, defining openings for first and second terminals. Only the contact surface terminals of the battery are exposed for proper use of the battery.

If the film of the battery label is broken or cut through, shorting of the battery is possible. The rims and outer circumference of a dry cell battery must be protected, or the battery may short circuit. Battery labels insulate the battery cans. Also, the label may protect the product and user from leakage of the components of the can. Many dry cell batteries are disposable, and, even for those that are not, the reliability and expense of labels that provide appropriate protection and designate trademarks and origin of manufacture are significant factors in producing batteries.

Before application, labels are generally longer than the can of the battery at both ends. Labels are removed from release liners and wrapped around batteries with edges extending beyond the rims of the battery. The wrapped battery passes through a heating unit that heats the portions of the label that extend beyond the can. Being heat shrinkable, the extended edges of the label shrink around the rims of the battery. The shrunken label wraps around the rims of the battery forming a tight protective seal. Wrinkling or folding of the label along the rims can render the battery label visually unacceptable or less effective because the resistance to external destructive forces will be less.

Multi layer battery labels continue to function adequately for dry cell batteries. Single ply battery labels are generally less expensive to produce.

One such method includes the label shown in Patent Cooperation Treaty application number U.S. 96/10769, which was published Dec. 27, 1996. It shows a single ply label for labeling dry cell batteries formed of a transparent heat shrinkable polymeric film backing. It has third and fourth ends that extend beyond the opposed ends of the battery. An alkali resistant, electrically non-conductive, opaque pigmented layer is applied over the inner surface of the film backing. An electrically non-conductive, pressure sensitive adhesive layer is applied over the pigmented layer along at least the edges that are parallel to the axis of the battery.

Also, U.S. Pat. No. 5,292,566 shows the layer of metal moved from between layers of heat shrinkable film to between a heat shrinkable polymeric film layer and a layer of pressure sensitive adhesive. In the above PCT application, the applicant describes some problems of this embodiment. The bond of the metal to the polymeric layer is weak and the layer of metal is susceptible to cracking, which may penetrate the pressure sensitive adhesive layer and short circuit the battery.

Next, U.S. Pat. No. 5,190,609 describes a UV cured varnish for the top layer of polymeric film. This label has found limited acceptance because the coating has proven to be the weak link exhibiting poor abrasion resistance and resistance to environmental conditions.

It has therefore been found beneficial to produce a single ply battery label that provides insulation and protection without having weak links, problems with cracking metallization, and defects such as wrinkling and unacceptable visual aspects due to overlapping varnish when the film is shrunk on the rims of the battery. The label along the rims of the battery will have a non-wrinkled smooth continuous surface.

SUMMARY OF THE INVENTION

The invention may be described as a battery label having a single heat-shrinkable polymeric layer, a graphic layer, and a UV cured, heat, electron beam, or polymerized varnish layer having geometric patterns on the two linearly extending edges that correspond to the portion of the label that extends beyond and wraps around the rims of the battery. The varnish acts as a protective coating.

The label includes a single layer of polymeric film adapted to shrink around the rims of a dry cell battery. On the outer surface of the film, the label includes a printed metallized layer or an ink layer. This is the graphic layer. A layer of varnish is applied over the graphic layer to coat the surface with a thin film. This layer of varnish is applied in a thickness required to protect the print and/or the metal from adverse external forces. Because of this varnish layer, no clear film laminate is needed.

The varnish does not shrink to a substantial degree, but the polymeric film does shrink when heat (generally greater than one hundred fifty degrees Fahrenheit (150° F.)) is applied to the extended edges of the label in order to wrap the battery rims. The varnish may shrink less than one percent (1%), but the polymeric film will shrink between twenty and sixty percent (20%–60%). The difference in shrinkage can cause defects such as distortion, folds, or overlapping varnish on the rims of the battery after the film shrinks. Folds, ridges, or overlapping may produce unacceptable results. Yet, varnish must provide a protective reinforcement from abrasion and impact for the battery, as well as, protecting the ink layer or the print on the metallized layer. The label of the present invention provides a substantially continuous, smooth outer layer of varnish protection for the battery.

On the label edges that shrink and fold over the rims of the battery, the varnish has predetermined geometric patterns to accommodate shrinkage of the film. As the film shrinks, the area of the pattern between the varnished surfaces closes to produce a substantially continuous varnish protective layer that covers the rims of the battery. There is little distortion from the shrinkage of film having patterned varnish. The result is a substantially continuous surface of varnish protectant without pleating, folding or overlapping. The pattern must have some varnish, and the shrinkage of the film determines the area containing varnish. The unvarnished portion of the pattern closes when the film shrinks so the varnished portions approach each other. For example if the film shrinks approximately fifty percent (50%), then the varnish will cover between twenty and sixty percent (20%–60%) of the patterned surface. Many variations of patterns include the preferred sawtooth design and variations of bars, crosses, and dots. The objective of the pattern is to form a substantially continuous smooth varnish surface over the battery rims after heat is applied and shrinkage takes place.

An adhesive layer on the inner surface of the film allows the label to stick to the battery. Before application of the label on the battery, the labels may have a release liner applied over the adhesive layer. This allows for storage of the unused labels and for their application by mass production machinery in a continuous operation.

DETAILED DESCRIPTION OF THE INVENTION

Figure 1:
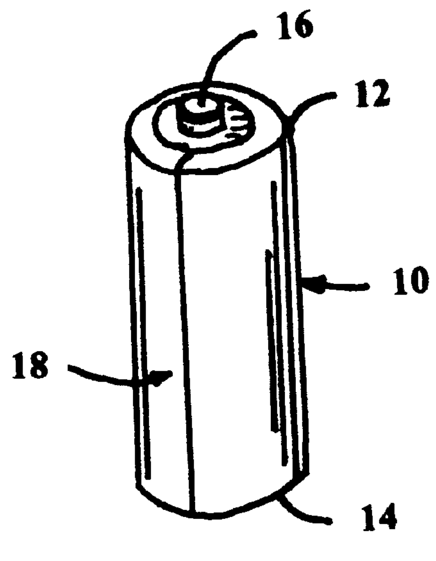
FIG. 1 shows a perspective view of the label applied to a battery.

FIG. 1 shows a label applied to a dry cell battery 10 with rims 12 and 14. The battery 10 has positive terminal 16 and a negative terminal (not shown). The battery 10 is partially encased within a nonconductive label 18 that extends beyond and wraps around the rims 12 and 14, defining openings for the positive terminal 16 and the negative terminal.

Figure 2:
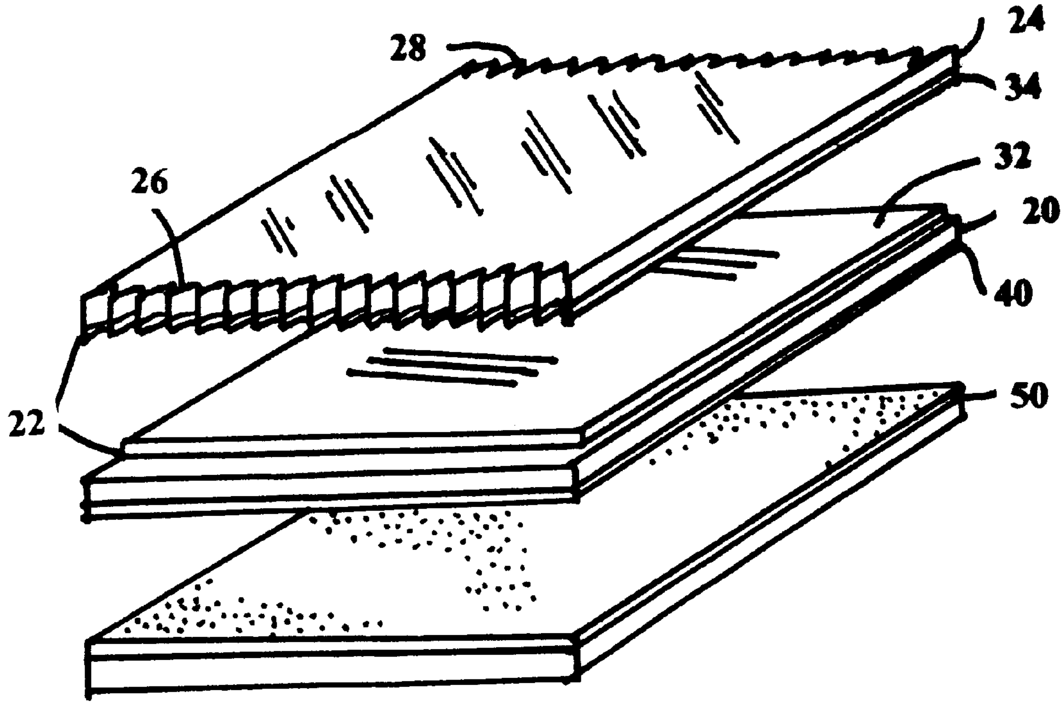
FIG. 2 is an exploded view illustrating a label and a release liner.

FIG. 2 shows one embodiment of a label 18 having a single heat-shrinkable polymeric layer 20, a graphic layer 22, and a varnish layer 24 having geometric patterns on two edges 26 and 28.

The label 18 includes a single layer of film 20 the ends of which shrink around the rims 12 and 14 of a dry cell battery 10. The film 20 is a single ply polymeric film 20. Film 20 can be a polyvinyl, polyolefin or polyester between a half mil (0.0005 inch) and 5 mil (0.005 inch) thick, but preferably between 1 and 3 mils (0.001–0.003 inch) thick. It is preferably polyester or polyvinyl chloride (PVC). The film 20 may also be polyolefin such as polypropylene that has a shrinkage of between twenty and sixty percent (20%–60%) at temperatures exceeding one hundred fifty degrees Fahrenheit (150° F.). A suitable film can be purchased from Kalle Pentaplast B.V. The film 20 is designed to insulate and protect the battery 10.

Figure 3:
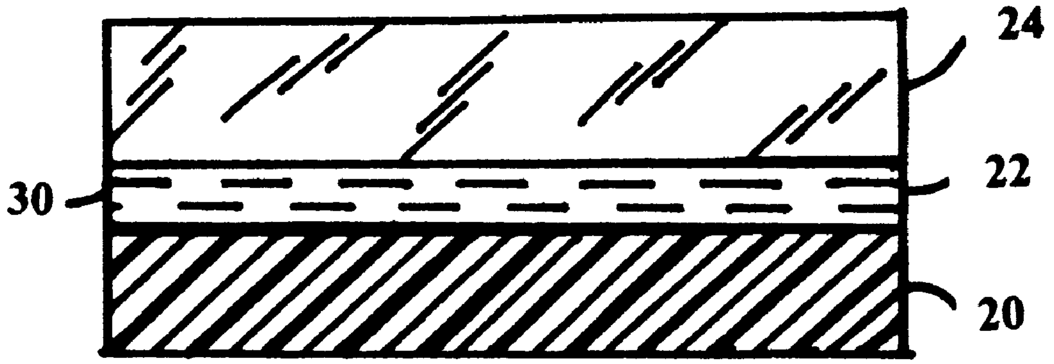
FIG. 3 is an enlarged side elevation of an alternative embodiment of the label.

The graphics layer 22 may include a metallized layer 32 combined with a print layer 34 as shown in FIG. 2, or it may be just an ink layer 30 as shown in FIG. 3. Although it is understood by those of ordinary skill in the art that printing on the metallized layer or printing on the film layer is done in discrete locations, for purposes of simplicity the printing is illustrated in the drawings as being an entire layer. The edges of the ink layer 30 may be printed in a geometric pattern that complements the patterned edges 26 and 28. The varnish may be a clear ink. One or more layers, preferably decorative ink, can be disposed as the ink layer 30 or on the metallized layer 32.

The label includes a single layer of polymeric film 20 with ends that extend beyond and are adapted to shrink around the rims 12 and 14 of a dry cell battery 10. On the outer surface of the film, and underlying the varnish layer 24, the label can be metallized with a very thin aluminum coating in a process known to those of ordinary skill in the art. This aluminum coating should be less than a fifth mil (0.0002 inch), and it may be deposited by aluminized vapor. The metallized layer 32 may serve as a moisture barrier and have visually appealing properties.

Print graphics can be printed on the metallized layer 32. Preferably, a primer (not shown) will be deposited on the metallized surface 32 to assist the adhesion of the paint or ink of the print 34. The metallized layer 32 is preferably disposed between the polymeric film 20 and the varnish layer 24. Positioning the polymeric film 20 between the metallized layer 32 and the adhesive layer 40 reduces the concerns about broken metal severing the adhesive layer 40.

The layer of varnish 24 is applied over the graphic layer 22 to coat the surface in a thickness required to protect the ink or the printed metallized surface from adverse external forces. Because of this varnish layer 24, no clear film laminate is needed.

The preferred method of applying varnish is flexographic printing. Other methods are known to one of ordinary skill in the art that include rotary screen printing, rotogravure, and letter press.

The varnish does not shrink to a substantial degree, but the polymeric film 20 does shrink when heat, generally greater than one hundred fifty degrees Fahrenheit (150° F.), is applied to the patterned edges 26 and 28 in order to wrap the battery rims 12 and 14. The varnish may shrink less than one percent (1%), but the polymeric film 20 will shrink between twenty and sixty percent (20%–60%). The difference in shrinkage can cause defects such as distortion, folds, or overlapping varnish on the rims 12 and 14 of the battery after the film 20 shrinks.

The varnish layer 24 acts as a protective coating. Preferably the varnish is UV cured. The varnish layer 24 provides a protective reinforcement from abrasion and impact for the battery 10, as well as, protecting the ink 30 or the print graphics 34 on the metallized layer 32. The varnish should be of a type that provides high abrasion, scuff, impact, and cut through resistance. One varnish that has been proven to be effective for battery labels of the type disclosed herein can be purchased from Northwest Coatings, designated as 11264A. The varnish layer can be between 0.2 mil and 1.0 mil, but when the varnish layer 24 is thicker, it is more susceptible to cracking.

On the patterned edges 26 and 28 of the varnish layer 24 that shrink and fold over the rims 12 and 14 of the battery 10, the varnish has predetermined geometric patterns to adapt to shrinkage of the film 20. As the portions of film 20, which are not covered by varnish, shrink, the area of the pattern between the varnished surfaces closes resulting in a substantially continuous varnish protective layer that covers the rims 12 and 14 of the battery 10. Those portions of the film 20 that are covered by varnish experience no shrinkage or minimal shrinkage. There is little distortion from the shrinkage of film 20 having patterned varnish edges 26 and 28. After heat is applied, the varnish provides a substantially continuous surface of protectant without folding or overlapping.

Figure 4:
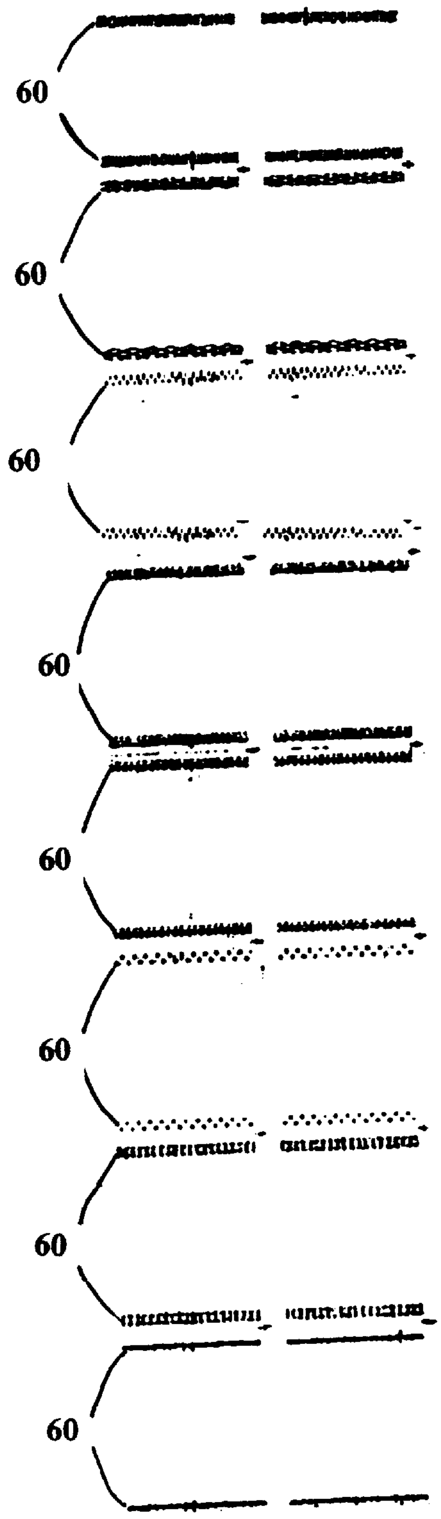
FIG. 4 shows eight variations of varnish patterns for the label edges.
Figure 5:
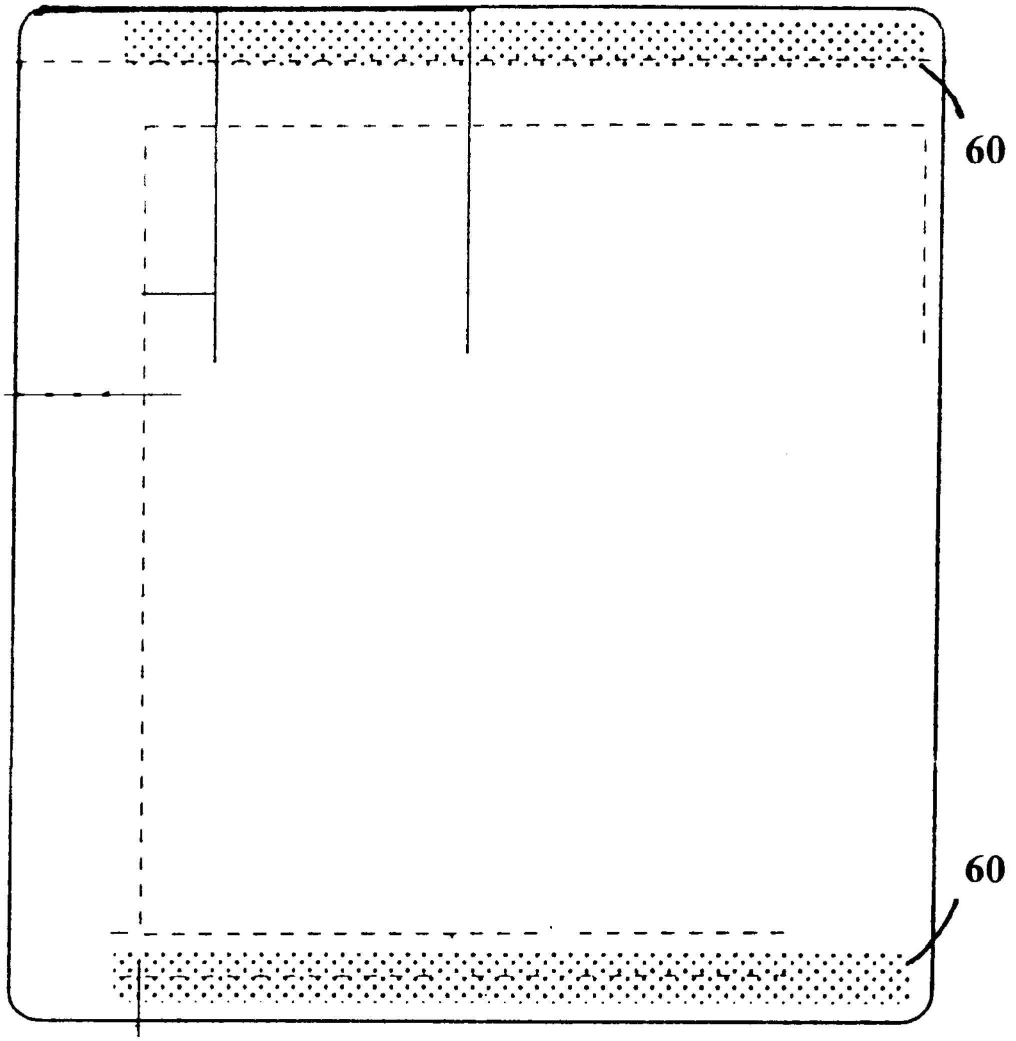
FIG. 5 shows a variation of a varnish pattern.
Figure 6:
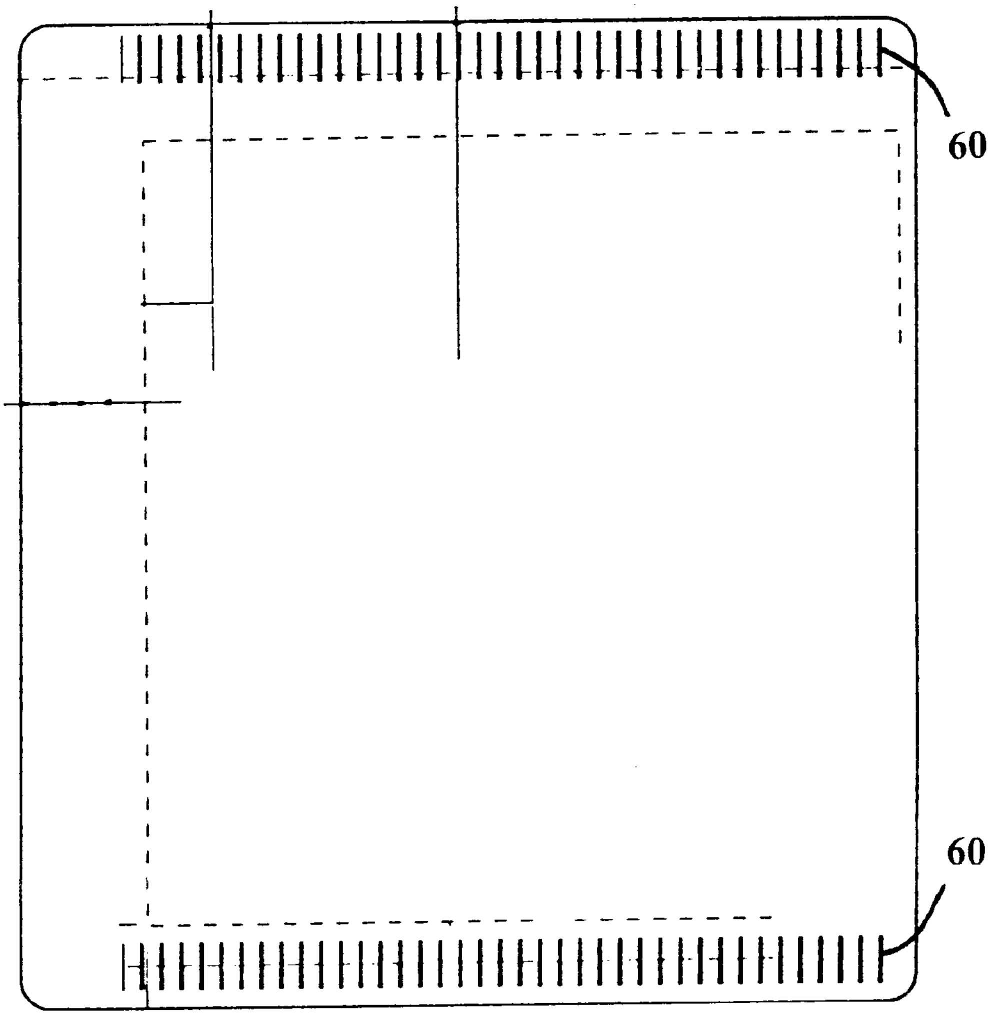
FIG. 6 shows a variation of a varnish pattern.
Figure 7:
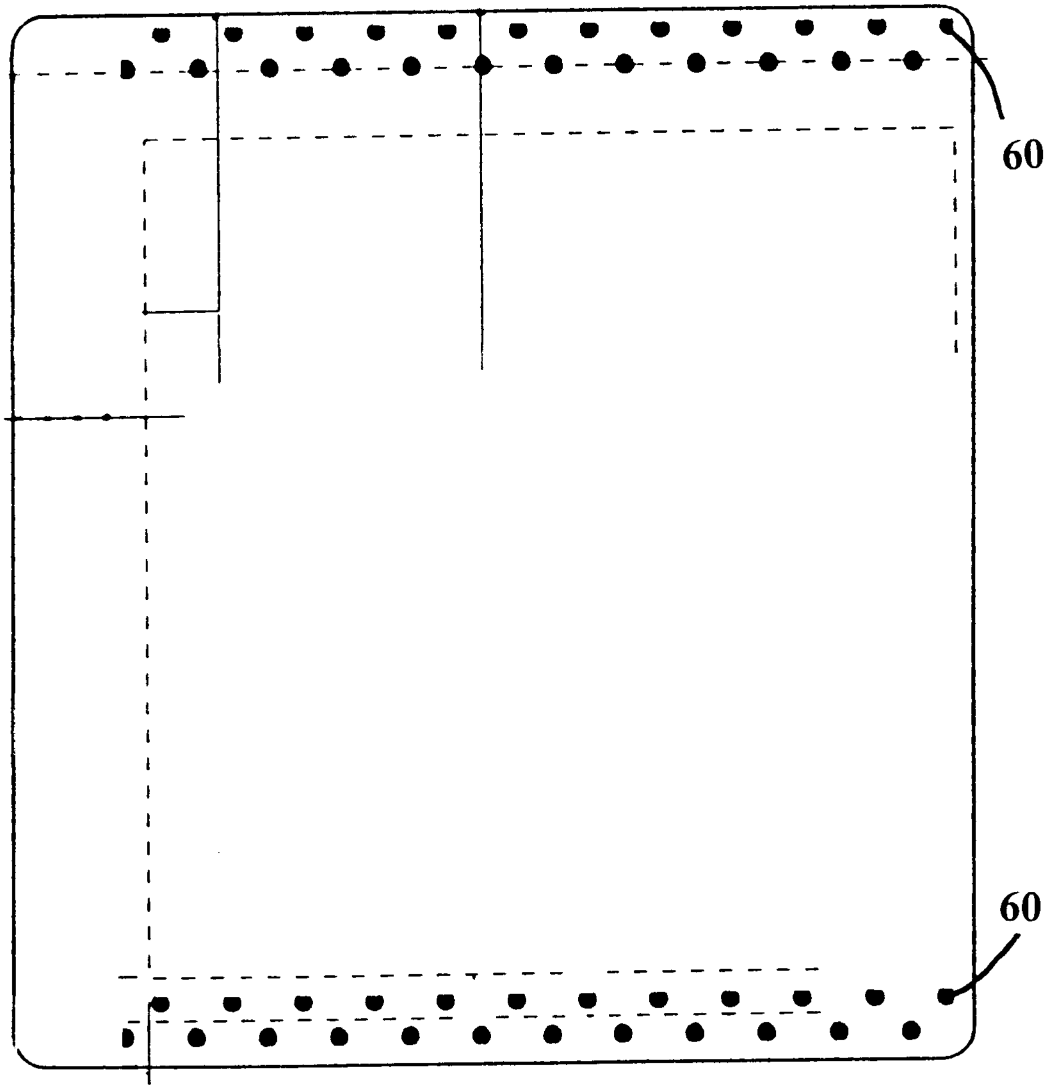
FIG. 7 shows a variation of a varnish pattern.
Figure 8:
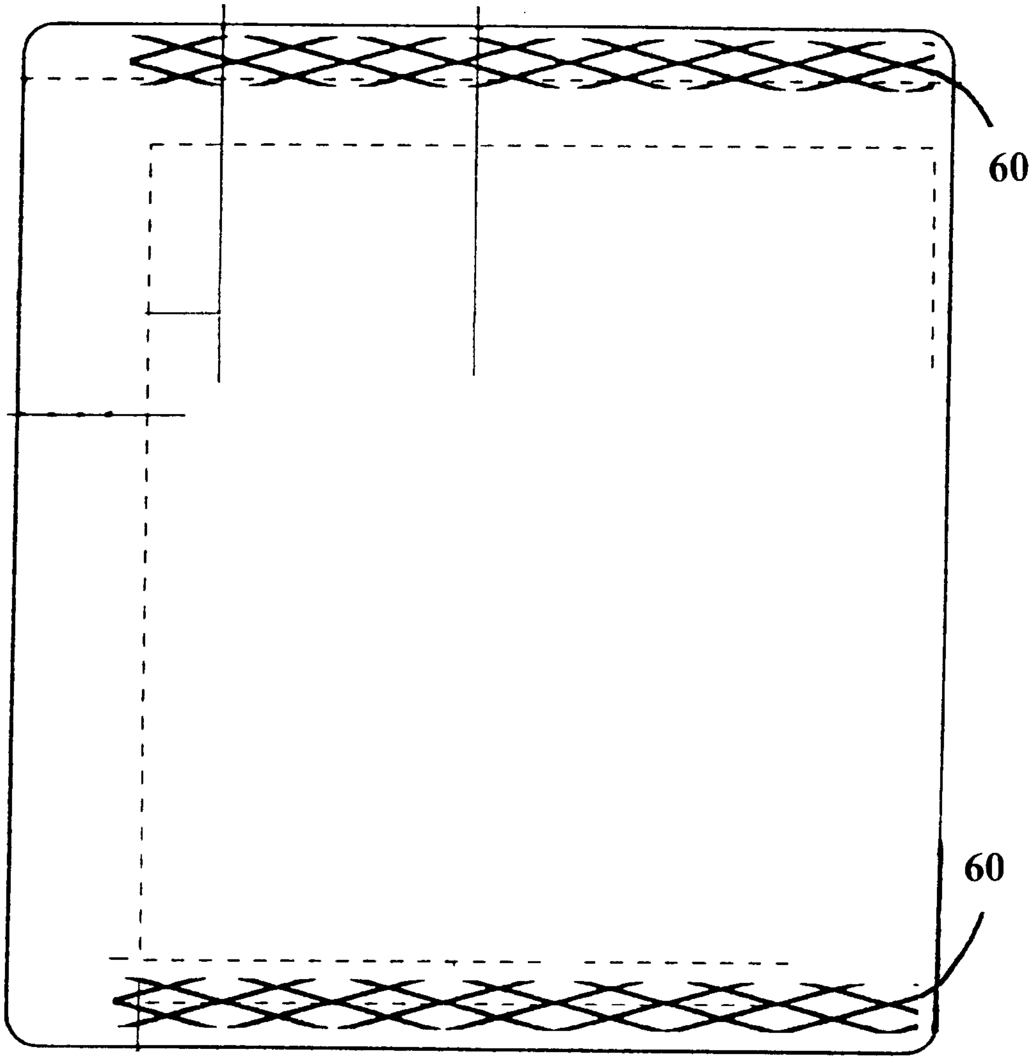
FIG. 8 shows a variation of a varnish pattern.

Each pattern 60 must have some varnish, and the shrinkage of the film 20 determines the area containing varnish. For example if the film 20 shrinks fifty percent (50%), then the varnish pattern may cover approximately fifty percent (50%) of the overall surface. The variations of patterns include the preferred sawtooth design (FIG. 2), variations of bars, dots, and crosses (FIG. 4). The objective of the pattern 60 is to form a continuous surface that provides a smooth varnish surface to protect the battery rims 12 and 14 after heat is applied and the label edges shrink.

In addition to a polymeric film layer 20, a graphics layer 22, and a varnish layer 24, the label may include an adhesive layer 40 that is covered by a release liner 50. Pressure sensitive and laminating adhesives can be deposited on the polymeric film 20 to form an adhesive layer 40 on the side that will contact the battery 10. Preferably, the pressure sensitive adhesive is deposited on the entire side of the film 20 that will contact the battery 10. Pressure sensitive adhesive can be applied just to the four edges of the film 20 or just to the two edges that overlap along the long axis of the battery 10. Conventional pressure sensitive and laminating adhesives are well known in the art. An acrylic adhesive is preferred.

An adhesive layer 40 insures that the label will stick to the battery can and not become detached during shipment or handling. The adhesive layer 40 is applied to the inner surface of the polymeric film 20. Before application of the label 18 on the battery 10, a label 18 has a release liner 50 applied over the adhesive layer 40. The release liner 50 is preferably a silicone coated paper or film that has appropriate release properties. A release liner allows for storage of the unused labels and for their application by mass production machinery in a continuous operation.

Although the preferred embodiment of the invention is illustrated and described in connection with a sawtooth pattern, it can be adapted for use with a variety of geometric patterns adapted to form a substantially continuous surface with different shrink ratios.

FIG. 4 shows numerous variations of modified embodiments of the pattern 60 used on patterned edges 26 and 28.

Other embodiments and equivalent batteries, labels, and methods are envisioned within the scope of the invention. Various features of the invention have been particularly shown and described in connection with the illustrated embodiment of the invention, however, it must be understood that these particular arrangements merely illustrate and that the invention is to be given its fullest interpretation within the terms of the appended claims.

What is claimed is:

1. A single ply label, adapted to shrink around rims of a dry cell battery, comprising:

a shrinkable polymeric film having an inner surface that is adapted to adhere to the battery and an outer surface;

said film including a first linear end and a second linear end that are adapted to extend beyond the rims of the battery;

graphics applied to the outer surface of said film;

a varnish layer applied over said graphics, said varnish layer defining patterned edges;

said patterned edges defining a predetermined area overlying said linear ends coated with varnish and a predetermined area of said linear ends uncoated with varnish.

2. The label of claim 1 further comprising a metallized layer deposited on a surface of said film.

3. The label of claim 2 wherein said metallized layer is a vapor deposited aluminum.

4. The label of claim 2 wherein said film is a polyvinyl chloride.

5. The label of claim 1 further comprising an adhesive layer applied to the inner surface of said film.

6. The label of claim 1 wherein said varnish layer is between 0.1 and 2.0 mil thick.

7. The label of claim 1 wherein said graphics is an ink applied at discrete locations on said outer surface of said film.

8. The label of claim 7 wherein edges of said ink contain geometric patterns that complement said varnish patterned edges associated with the rims of the battery.

9. The label of claim 7 further comprising an adhesive layer applied to a portion of the inner surface of said film.

10. The label of claim 1 wherein said patterned edges form sawtooth pattern.

11. The label of claim 1 wherein a plurality of dots form said patterned edges.

12. The label of claim 1 wherein a plurality of lines form said patterned edges.

13. The label of claim 1 wherein a plurality of crosses form said patterned edges.

14. A single ply label adapted to shrink around rims of a dry cell battery, the label comprising:

a shrinkable polymeric film having an inner surface and an outer surface;

a metallized layer deposited on the outer surface of said film;

a print layer applied over said metallized layer;

a varnish layer applied over said print layer, said varnish layer defining patterned edges adapted to be associated with the rims of the battery said patterned edges defining a predetermined area overlying said linear ends coated with varnish and a predetermined area of said linear ends uncoated with varnish; and an adhesive layer applied to the inner surface of said film.

15. A battery having a label shrunken around rims of said battery, said label comprising:

a polymeric film having an inner surface in contact with said battery and an outer surface;

graphics applied to the outer surface of said film, a varnish layer applied over said graphics, wherein said film is shrunken at the rims of said battery and said varnish layer forms a smooth, substantially continuous surface resulting from gaps between a pattern of varnish closing when said polymeric film shrinks around the rims of said battery.

16. The battery of claim 15 wherein said film includes a first linear end and a second linear end that extend beyond the rims of said battery, said pattern of varnish overlying said first and second linear ends of said film, said pattern of varnish defining a predetermined area of said linear ends coated with said varnish.

* * * * *